United States Patent
Dunstan et al.

(10) Patent No.: US 11,421,398 B2
(45) Date of Patent: Aug. 23, 2022

(54) PADDING MACHINE

(71) Applicant: OZZIE'S PIPELINE PADDER, INC., Leduc (CA)

(72) Inventors: Robert Dunstan, Calgary (CA); Chris Argue, Phoenix, AZ (US); David Jakus, Phoenix, AZ (US); Larry Owens, Phoenix, AZ (US); Rob Khaler, Phoenix, AZ (US); Matthew Walz, Leduc (CA); Reece Grywul, Leduc (CA)

(73) Assignee: ESI PIPELINE SERVICES, INC., Calgary (CA)

(*) Notice: Subject to any disclaimer, the term of this patent is extended or adjusted under 35 U.S.C. 154(b) by 566 days.

(21) Appl. No.: 16/373,188

(22) Filed: Apr. 2, 2019

(65) Prior Publication Data

US 2020/0199846 A1    Jun. 25, 2020

(30) Foreign Application Priority Data

Dec. 21, 2018    (CA) .................. CA 3028280

(51) Int. Cl.
  *E02F 5/22* (2006.01)
  *B07B 1/10* (2006.01)
  (Continued)

(52) U.S. Cl.
  CPC .............. *E02F 5/226* (2013.01); *B07B 1/005* (2013.01); *B07B 1/10* (2013.01); *B07B 13/16* (2013.01); *B65G 41/008* (2013.01); *E02F 7/06* (2013.01)

(58) Field of Classification Search
  CPC .. E02F 5/226; E02F 7/06; B07B 1/005; B07B 1/10; B07B 13/16; B07B 1/4609; B07B 1/4618; B07B 2201/02; B65G 41/008
  (Continued)

(56) References Cited

U.S. PATENT DOCUMENTS 2,255,581 A * 9/1941 Ewing .................. A47G 5/00
                                                    160/392
2,857,691 A   10/1958 Curran
(Continued)

FOREIGN PATENT DOCUMENTS

DE    75 05 976 U    6/1978
DE    4118022 A1    12/1992
(Continued)

OTHER PUBLICATIONS

English language Abstract of DE4445515.
(Continued)

*Primary Examiner* — Michael McCullough
*Assistant Examiner* — Molly K Devine
(74) *Attorney, Agent, or Firm* — Ware, Fressola, Maguire & Barber LLP

(57) ABSTRACT

A padding machine for moving along a side of a ditch, scooping up excavated material from the side of the ditch, and sifting the excavated material into padding material for falling in the ditch comprises a frame comprising side frame members and frame rails spaced apart from the side frame members. A screening belt is driven around pulleys supported by the frame. The screening belt comprises a screen for collecting and conveying the excavated material upwardly. The screen comprises apertures for sifting the excavated material into padding material by permitting the padding material to fall through the apertures of the screen. The screen runs over the frame rails which support the screen. A discharge conveyor is mounted to the frame beneath an upper run of the screening belt. The discharge conveyor receives the padding material passing through the screen and discharges the padding material into the ditch.

17 Claims, 14 Drawing Sheets

(51) Int. Cl.
*E02F 7/06* (2006.01)
*B07B 1/00* (2006.01)
*B07B 13/16* (2006.01)
*B65G 41/00* (2006.01)

(58) Field of Classification Search
USPC ............................. 37/142.5; 209/412, 403
See application file for complete search history.

(56) References Cited

U.S. PATENT DOCUMENTS

| | | |
|---|---|---|
| 3,596,384 A | 8/1971 | Neujahr |
| 4,190,527 A | 2/1980 | Spiller |
| 4,301,910 A | 11/1981 | Price |
| 4,377,365 A | 3/1983 | Layh |
| 4,633,602 A | 1/1987 | Layh et al. |
| 4,664,791 A | 5/1987 | McClain et al. |
| 4,912,862 A | 4/1990 | Bishop et al. |
| 5,097,610 A | 3/1992 | Bishop |
| 5,120,433 A | 6/1992 | Osadchuk |
| 5,195,260 A | 3/1993 | Osadchuk |
| 5,261,171 A | 11/1993 | Bishop |
| 5,363,574 A | 11/1994 | Osadchuk |
| 5,375,721 A | 12/1994 | Lavigne |
| 5,430,962 A | 7/1995 | Osadchuk |
| 5,479,726 A | 1/1996 | Bishop |
| 5,540,003 A | 7/1996 | Osadchuk |
| 5,741,087 A | 4/1998 | Osadchuk |
| 2004/0020841 A1 | 2/2004 | Seyffert |
| 2008/0092410 A1 | 4/2008 | Layh et al. |

FOREIGN PATENT DOCUMENTS

| | | |
|---|---|---|
| DE | 4445515 A1 | 6/1996 |
| EP | 0 247 844 A2 | 12/1987 |
| EP | 0 908 599 A2 | 4/1999 |
| KR | 2013 0046593 A | 5/2013 |
| WO | 9312321 A1 | 6/1993 |

OTHER PUBLICATIONS

English language Abstract of DE4118022.
English language Abstract of KR20130046593.
English language Abstract of DE7505976.
European Communication issued in European Patent Application 19168572.6 dated Jul. 17, 2020.

\* cited by examiner

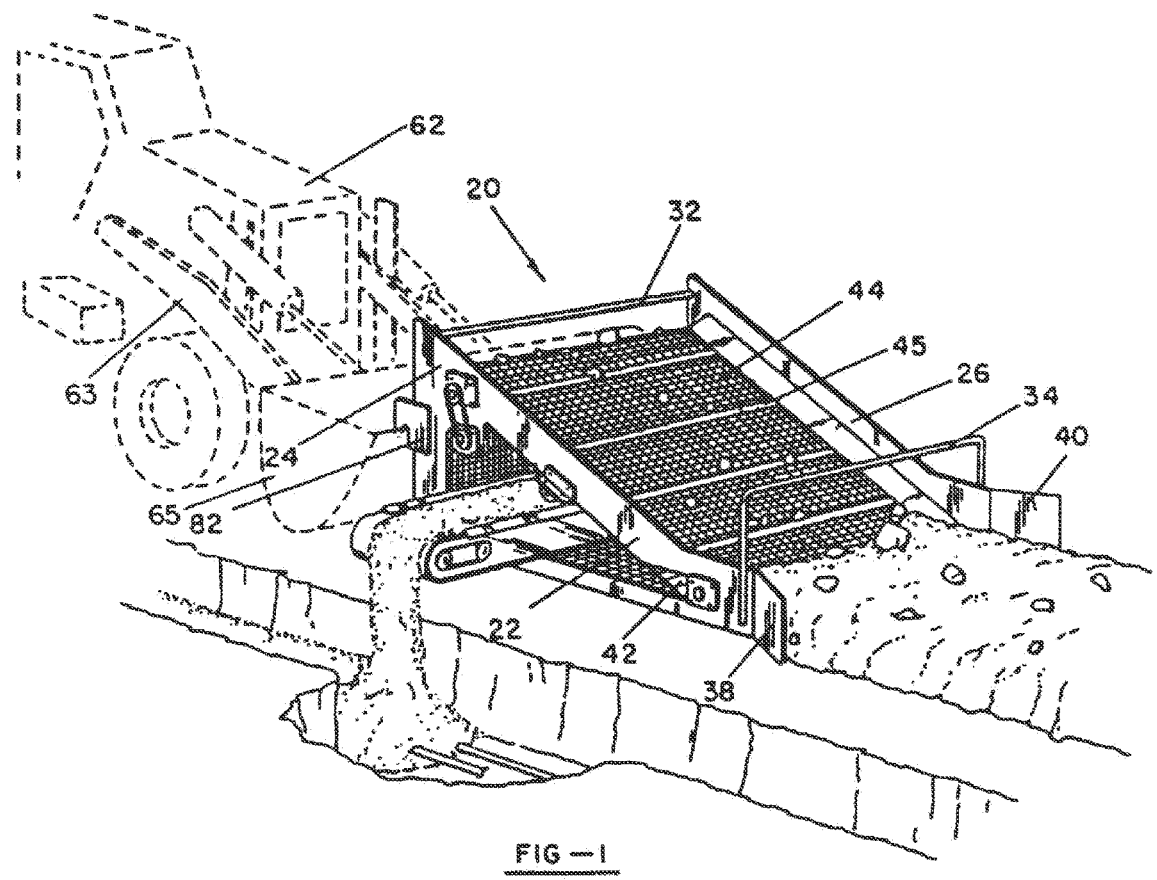
FIG—1
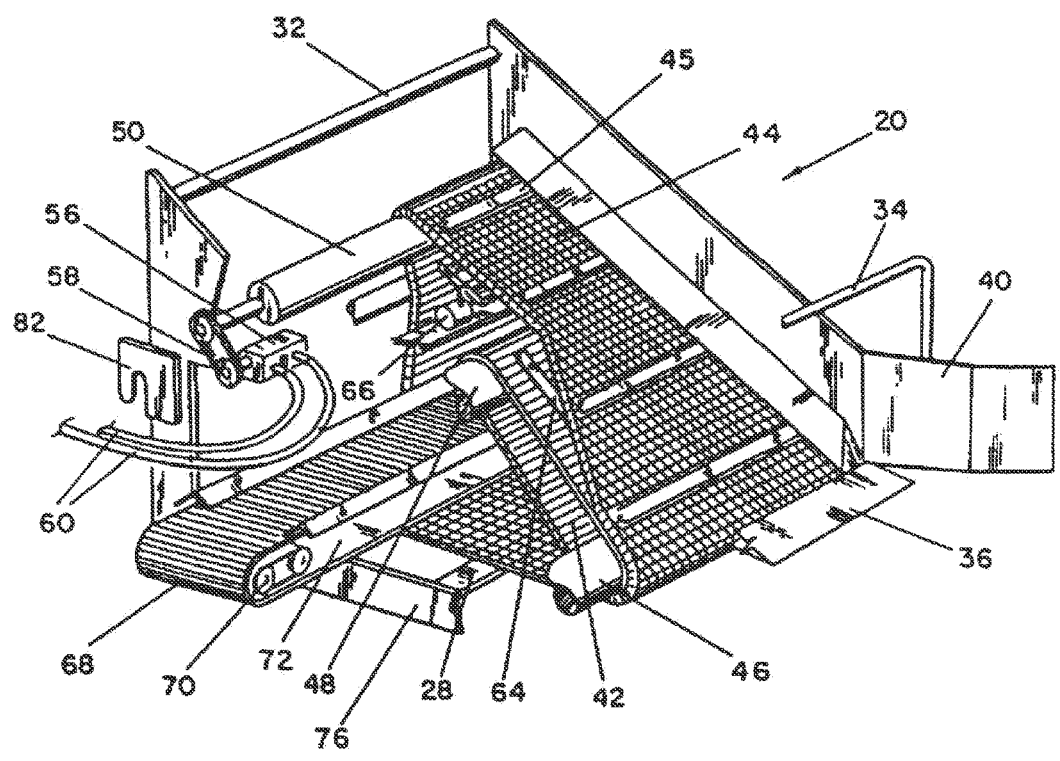
FIG—2

PADDING MACHINE

TECHNICAL FIELD present disclosure relates generally to earthmoving machines and apparatus. More particularly, the present disclosure, is related to padding machines.

BACKGROUND

Underground cables and pipelines are typically emplaced by laying the cable or pipeline in a prepared trench and subsequently backfilling the trench.

Some cables and pipelines are susceptible to damage from stones or other hard objects in the backfill material. For example, optical fiber communications cables are considered particularly susceptible to damage in this manner, as are polymeric or plastic pipelines. Also, steel pipes are increasingly provided with protective polymeric coatings, which must be protected from penetration or damage by hard objects.

Consequently, in the laying of cables and pipelines it is increasingly sought to backfill the trench with fill material that is relatively free of stones or other hard objects. One way to achieve this is to backfill the trench with sand or other suitable fill material brought from a remote source of sand or rock-free soil. This approach is however relatively expensive and time-consuming. Further, where steel pipe is covered with a layer of sand, the filled trench tends to collect standing water in the porous sand fill, leading to premature corrosion of the pipe. Also, the use of a fill material that is different from the surrounding soil results in a loss of cathodic protection, which also leads to premature corrosion of steel pipe. The alternative is to screen the soil dug from the trench, to remove stones and other foreign objects, and return the screened soil to the trench. Several machines, known as padding machines, have been disclosed in the prior art for this purpose.

For example, U.S. Pat. No. 2,857,691 to Curran discloses a tracked vehicle having a vertically swingable boom that extends laterally over a trench. The boom includes a tube having an enclosed auger. At the far end of the boom from the vehicle is a rotating head which scoops up soil from alongside the trench, screens the soil, and transmits it to the auger, which conveys the screened soil along the tube and into the trench through openings in the tube. The Curran apparatus is particularly designed for use with a vehicle that is driven along the opposite side of a trench from the pile of soil that was removed from the trench and which extends alongside the trench.

U.S. Pat. No. 4,633,602, to Layh, et al., teaches the use of a gathering belt which dumps material onto a separator screen, allowing fines to fall onto a lateral belt. This device does not provide for screening during the initial conveying nor for attachment to vehicles, such as loaders and bulldozers.

U.S. Pat. No. 3,596,384 to Neujahr employs an auger to remove soil from the piled ridge of soil removed from a trench to a second auger, which conveys the soil to a screen and to a set of impellers which throw the screened soil into the trench.

U.S. Pat. No. 4,301,910 to Price also discloses a self-propelled backfilling machine which utilizes a conveyor belt to transport soil from a hopper into a trench.

U.S. Pat. No. 4,664,791, issued May 12, 1987 to McClain et al., also discloses a padding machine particularly designed to receive backfill material in a hopper and to sieve the material and dispense it into a trench.

The aforementioned padding machines are generally large machines intended and useful primarily for long-distance pipe laying operations in open country, where rights of way are wide and where there is little or no rugged terrain. Such machines have limited usefulness where rights of way are narrow, where trenches do not follow a straight path, or where the terrain is relatively rugged.

U.S. Pat. No. 5,479,726 discloses a compact padding machine and padding machine attachment for a vehicle. When padding of a ditch for a pipeline or cable is required, the padding machine is removably attached in a position at one end of a conventional bucket loader, bulldozer, or other base machine or vehicle, whereby said attachment moves along the path of travel of the vehicle. As the vehicle moves the padding machine attachment along one side of the pipeline ditch, the padding machine attachment picks up at least a portion of a pile of excavated material placed parallel to and along the same side of the ditch and processes the excavated material into padding material for placement into the ditch for padding the pipeline or cable.

Although the prior technologies are adequate for some applications, further improvements to the padding machine are desired particularly in order to improve productivity. Accordingly, an improved padding machine would be highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses padding machine having larger aperture steel and polyurethane-coating steel screens which are support by flight rails.

One inventive aspect of the disclosure is a padding machine for moving along a side of a ditch, scooping up excavated material from the side of the ditch, and sifting the excavated material into padding material for filling in the ditch that comprises a frame comprising side frame members and frame rails spaced apart from the side frame members. A screening belt is driven around pulleys supported by the frame. The screening belt comprises a screen for collecting and conveying the excavated material upwardly. The screen comprises apertures for sifting the excavated material into padding material by permitting the padding material to fall through the apertures of the screen. The screen runs over the frame rails which support the screen. A discharge conveyor is mounted to the frame beneath an upper run of the screening belt. The discharge conveyor receives the padding material passing through the screen and discharges the padding material into the ditch. The improved design results in a more efficient and productive padding machine.

Other inventive aspects of the disclosure may become apparent to the persons skilled in the art.

BRIEF DESCRIPTION OF THE DRAWINGS

These and other features of the disclosure will become more apparent from the description in which reference is made to the following appended drawings.

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 1 is an isometric view of a prior-art padding machine, shown attached to a loader and being used to partially backfill a trench containing a pipeline or cable.

FIG. 2 is a cut away isometric view of the padding machine shown in FIG. 1.

DETAILED DESCRIPTION OF EMBODIMENTS

Figure 3:
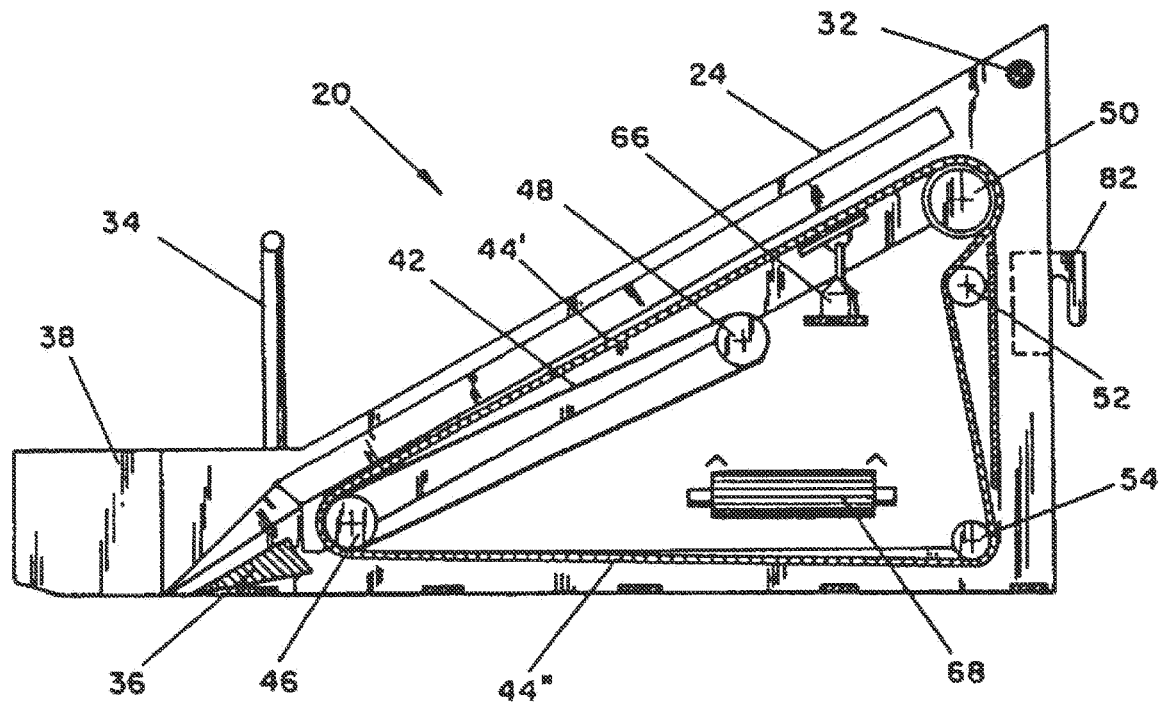
FIG. 3 is a side view in cross section of the padding machine of FIG. 1.
Figure 4:
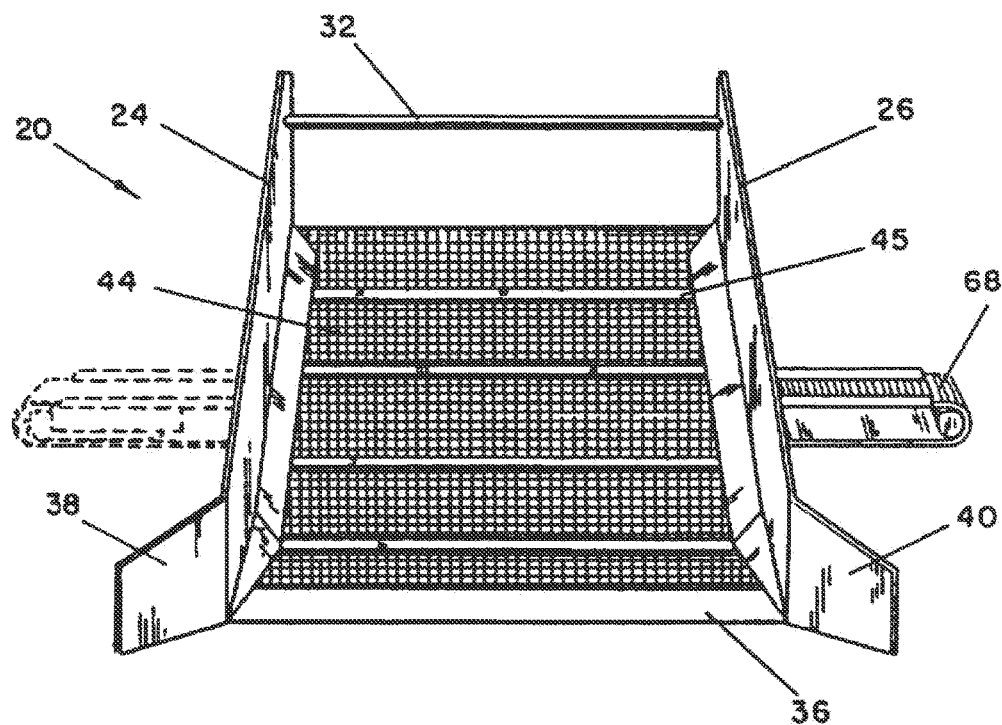
FIG. 4 is a front view of the padding machine of FIG. 1, with the conveyor belt shifted to the opposite side.
Figure 5:
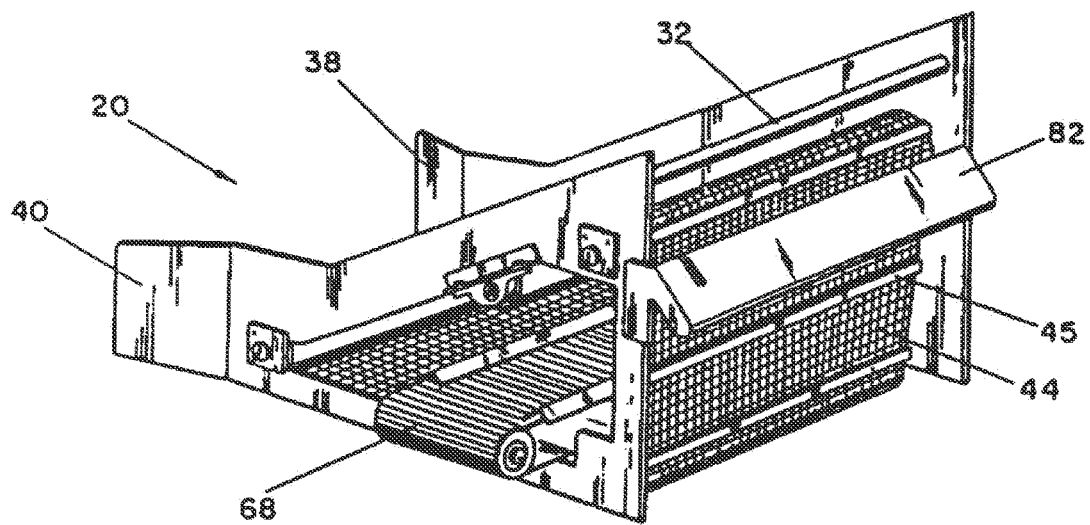
FIG. 5 is an isometric view of the padding machine of FIG. 1.

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

Illustrated in FIGS. 1 to 6 is a padding machine 20 according to the prior art. The padding machine 20 includes an angular frame 22 which includes a pair of triangular side frame members 24 and 26. The side frame members 24 and 26 are connected by several cross members, including several bottom frame members 28 or a solid plate, or a rear cross plate, and can include optional reinforcing members, cross bars, or safety bars 32 and 34. Additionally, the padding machine 20 includes a lip 36 which spans and connects the side frame members 24 and 26 at the forward end of the machine 20, and which is positioned to be located at ground level and to function as a cutting blade when the machine 20 is in operation. The side frame members 24 and 26 further include outwardly disposed wings 38 and 40 at their lower front ends, which function to collect and guide soil toward the center of the machine 20.

The padding machine 20 further includes an inclined conveyor belt 42 and an inclined screening belt 44. The conveyor belt 42 is a reinforced elastomeric belt, of the type customarily used in conveyor applications. The screening belt 44 is a chain link belt, e.g. having a chain link spacing size on the order of approximately one-half to one inch. The screening belt 44 may have a number of raised cross bars 45 on its outer surface, which function to assist in scooping earth onto the screening belt 44.

The conveyor belt 42 travels on a lower roller 46 and an upper roller 48, which are journaled in associated bearings mounted in the side frame members 24 and 26. The screening belt 44 also travels on the lower roller 46, and rides on top of the conveyor belt 42. Additionally, the screening belt travels over an upper drive roller 50 which is located at the top and rear of the frame 22, an idler roller 52 located beneath and slightly forward of the drive roller 50, and a lower roller 54 located at the rear lower corner of the frame 22. The rollers 50, 52 and 54 are all journaled in associated bearings which are mounted on the side frame members 24 and 26.

The drive roller 50 is driven by a hydraulic motor 56 which is mounted on the side frame member 24. The hydraulic motor 56 is connected to the drive roller 50 by a drive chain 58 and associated sprockets. The hydraulic motor 56 may be connected by means of hydraulic hoses 60 to a conventional auxiliary hydraulic power output, for example a hydraulic power output of a loader 62 as shown in FIG. 1.

The motor 56 drives the screening belt 44 by means of the drive roller 50. The screening belt 44 in turn drives the conveyor belt 42 as a consequence of traveling over the conveyor belt on roller 46. As a result the conveyor belt 42 and the screening belt 44 travel at the same speed.

Several tapered polymeric spacers 64 are positioned between the screening belt 44 and the conveyor belt 42, near the upper end of the conveyor belt 42. The spacers 64 operate to cause the screening belt 44 to separate from the conveyor belt 42 as the screening belt 44 and conveyor belt 42 travel upwardly from the lower roller.

A hydraulically driven vibrator 66 is mounted beneath the screening belt 44 at a position just beyond the roller 48. The vibrator 66 is positioned to shake the screening belt 44 as it passes beyond the end of the conveyor belt 42.

The padding machine 20 further includes a transverse discharge conveyor belt 68, which extends transversely with respect to the longitudinal axis and the direction of travel of the padding machine 20. The discharge conveyor belt 68 is positioned directly beneath the upper end of the inclined conveyor belt 42, so as to receive soil carried upwardly on the conveyor belt 42 and discharged over roller 48. The discharge conveyor belt 68 extends outwardly through an opening in the side frame member 24, and extends up to several feet from the frame 22 to as to enable fine-grained soil to be conveyed into a nearby trench.

The discharge conveyor belt 68 travels on rollers 70 which are journaled to an elongate conveyor frame 72. A reversible hydraulic motor, mounted within the elongate conveyor frame 72, drives the discharge belt 68. The conveyor frame 72 rests on transverse support rails 76. The conveyor frame 72 and the discharge belt 68 may be slid in either direction on the support rails 76, so as to be extendible from either side of the padding machine 20. This arrangement enables screened soil to be discharged into a trench on either side of the padding machine 20.

The rear ends of the padding machine side frame members 24 and 26 each include an upper ear and a lower ear, by which the padding machine can be attached to the arms 63 of a conventional loader 62. The side frame members 24 and 26 also include hooks 82, by which the padding machine can be engaged and supported by a bucket 65 of a loader or bulldozer, as shown for example in FIGS. 1 and 6. One of more hooks 82 are adapted to receive a conventional bucket 65.

Figure 6:
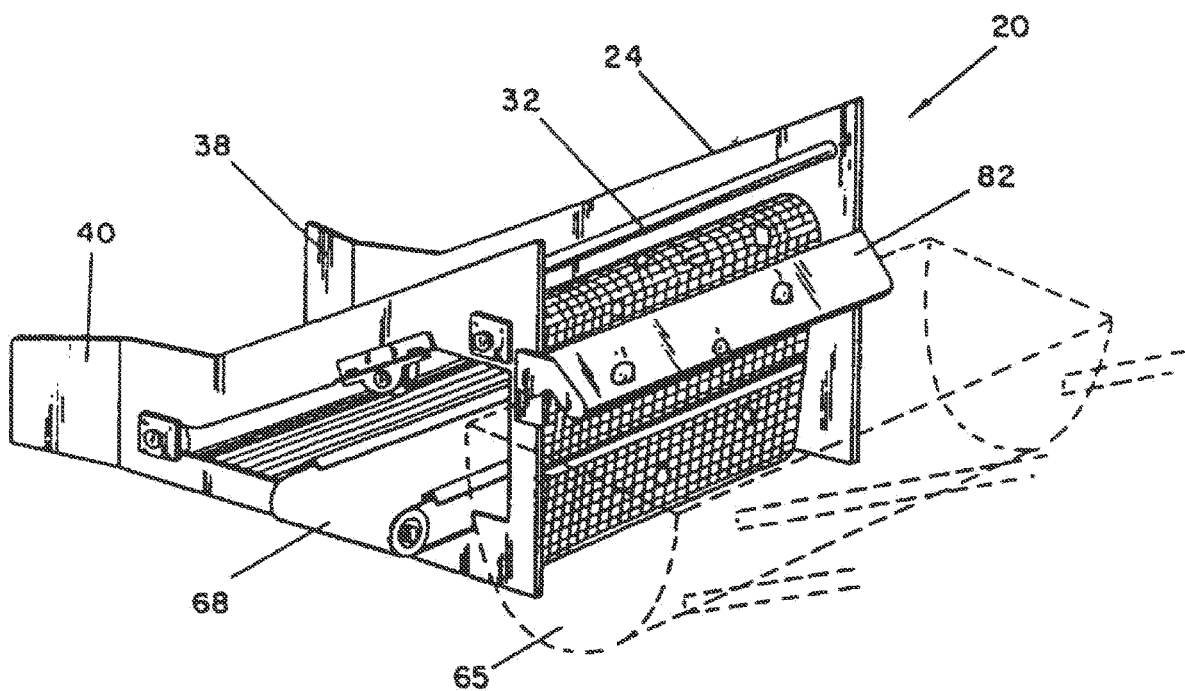
FIG. 6 is an isometric rear view of the padding machine of FIG. 1, shown attachable to a bucket of a loader or bulldozer.

In operation, the padding machine is attached to the front end of a loader, such as a bulldozer or loader 62 shown in FIG. 1, or the bucket, as shown in FIGS. 1 and 6. The padding machine is powered by the auxiliary hydraulic output of the loader 62. The padding machine 20 is positioned with the lip 36 at ground level, and is normally driven along the ridge of earth, or berm, that is formed adjacent a trench by conventional trench digging equipment. The lip 36 and the wings 38 and 40 collect the earth and guide it onto the screening belt 44.

As the earth is carried up the screening belt 44, fine grained soil passes through the screening belt 44 and onto the inclined conveyor belt 42, from where it is discharged onto the transverse discharge belt 68 and conveyed into the nearby trench. Rocks are carried to the top of the screening belt 44 and are discharged onto the ground behind the padding machine. Alternatively, rocks may be collected in a bucket behind the padding machine, or they may be conveyed to one side or the other by the auxiliary device described below, or they may be carried towards a bar to force rock to either side and down a chute (not shown).

The vibrator 66 serves to break up clods of fine grained soil and thereby facilitate its passage through the screening belt 44. The vibrator 66 is particularly useful where soil is damp or wet.

Illustrated in FIGS. 7-16 are two embodiments of the present invention. In a first embodiment, the padding machine includes a large-aperture steel screen. In a second embodiment, the padding machine includes a polymer/steel composite screen. These two different screens both provide larger apertures for the padding machine compared to the prior version of the padding machine, thereby significantly improving the padding machine's productivity.

The forward facing surface of the padding machine has an elevator which includes a steel elevator chain (also referred to as the screen) that acts like a perforated conveyor belt to pick up material from the ground and allow the fine components ("fines") to fall through the apertures of the screen while forcing the oversize material to go over the top of the machine and to be deposited back on the ground. The fines drop onto an elevator belt which is a conventional rubber conveyor belt disposed beneath the elevator chain, which dumps the fines onto the conveyor. The conveyor, in the illustrated embodiments, can be a standard rubber belt which may be adjustable from side to side for the purpose of depositing the fines into a ditch as the machine runs alongside the ditch. The elevator chain runs on multiple pulleys, preferably three pulleys (although additional pulleys may be provided in variants). The pulleys apply tension to drive the screen by the force of friction. The belt is guided into the center of those rollers by the collars which act upon the edges of the elevator chain to resist the forces imparted on it during regular operation.

In the first embodiment, the steel chain has larger-than-normal apertures to allow more material to fall through, thus allowing greater productivity. This required the use of relatively small wire in producing the screen due to manufacturing constraints. As a result, this screen was found to be fragile and, upon contacting the collars that would guide the screen from side to side, would be destroyed by the forces imparted by the elevator chain being pulled from one side or the other during work. Flight rails are provided to support the screen. Two steel rails are mounted on the frame (as shown in the figures) and with notches cut into bars (called flights) which are part of the elevator chain. This is used to help clear large rocks off the screen. Those notches allow the flights to ride on the flight rails and to force the screen to remain centered while imparting the forces on the strong center of the elevator chain instead of on the more fragile edges. This solution is effective in preventing the elevator chain from wearing out during use.

In the second embodiment, the screen is a composite polymer-steel screen. In one specific implementation, the screen is a polyurethane screen with a steel inlay. The figures depict the construction of the screen and its hinge mechanism. This polymer material was found to be quite tough, but extremely stretchy and vulnerable to being pinched and damaged at certain points in the machine. The screen's relatively soft polymer made it difficult to drive and it was also found that the flight rails as described above were inadequate for driving or guiding this type of screen. Upon further development, innovative technical solutions were devised to both these problems. For driving the screen, one of the pulleys has teeth. The teeth are similar to sprocket teeth. The teeth are preferably designed with a cross section to avoid overgripping the material. The teeth on the pulley transmits the torque of the driving motor(s) to keep the screen centered. To prevent the screen from being pinched and thus damaged, the elevator belt was removed from underneath the elevator chain, and has been replaced with a hard plate (as shown in figures). Although this solution was developed for the composite polymer-steel screen (the second embodiment), it works equally well for the purely steel screen (the first embodiment). This design reduces pinch points and thus damage to the screen. Both of these improvements result in significant increases to the screen lifetime and performance. It will be appreciated that the shape of the sprocket teeth may be varied from what is shown in the figures.

Figure 7:
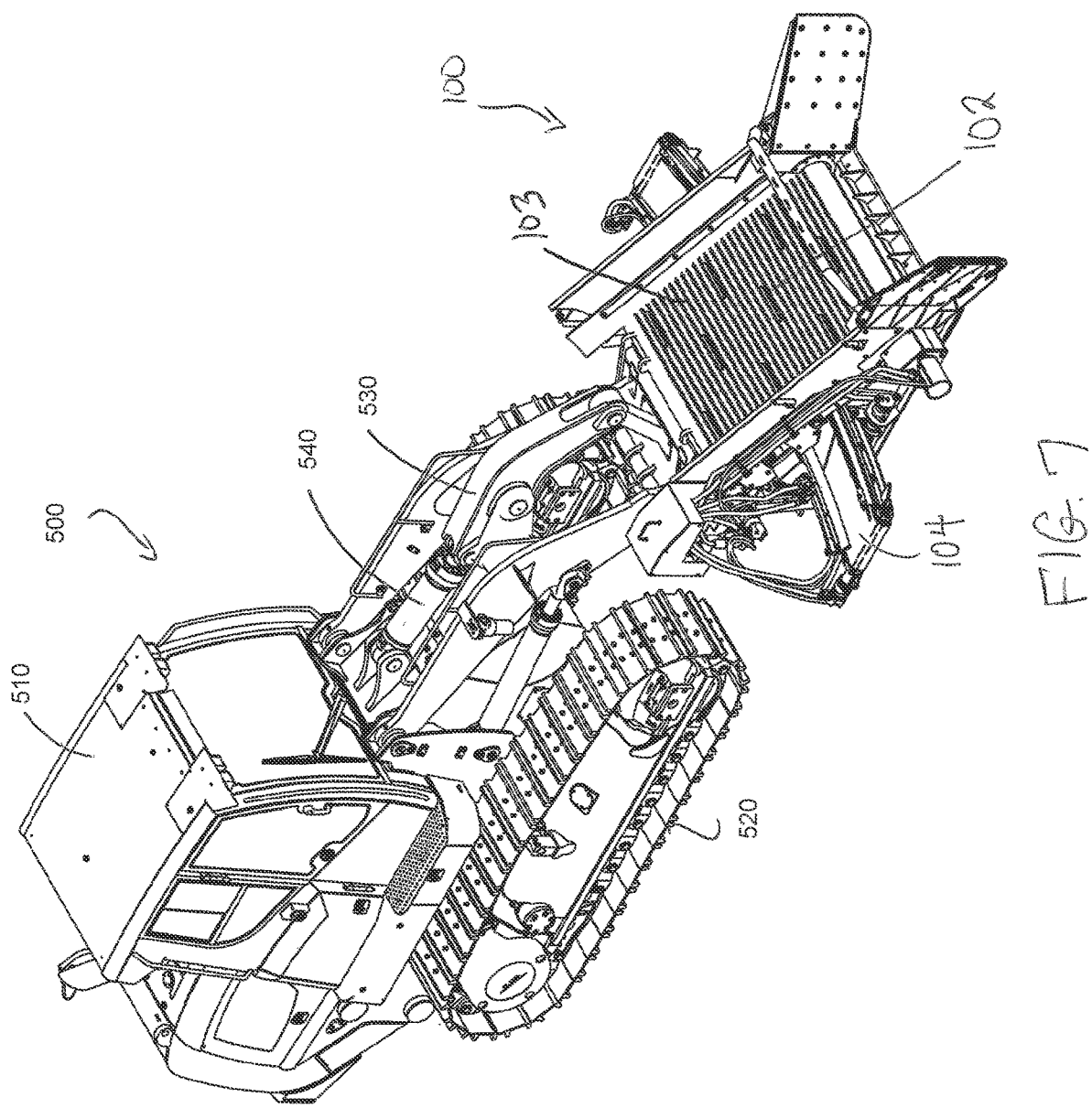
FIG. 7 is an isometric view of a padding machine attached to a tracked vehicle in accordance with an embodiment of the present invention.

FIG. 7 is an isometric view of a padding machine 100 attached to a tracked vehicle 500 in accordance with an embodiment of the present invention. The tracked vehicle 500 has a cab 510, tracks 520, front attachment mechanism 530 to detachably mount the padding machine 100, and one or more actuators 540 to move the front attachment mechanism and padding machine. The tracked vehicle 500 is merely an example of one type of vehicle for the purposes of illustration. The padding machine may be mounted to any other suitable type of vehicle. The padding machine 100 is designed for moving along a side of a ditch, scooping up excavated material from the side of the ditch, and sifting the excavated material into padding material for filling in the ditch. As will be described in further detail below, the padding machine has a frame comprising side frame members and frame rails spaced apart from the side frame members. As will be described in greater detail below, the padding machine includes a screening belt driven around pulleys supported by the frame, the screening belt comprising a screen for collecting and conveying the excavated material upwardly. The screen comprises apertures for sifting the excavated material into padding material by permitting the padding material to fall through the apertures of the screen. The screen runs over the frame rails which support the screen.

As illustrated by way of example in FIG. 7, the padding machine 100 includes a screening belt 102 (also referred to herein as a screen or conveyor belt). The padding machine 100 further includes a transverse discharge conveyor belt 104, which extends transversely with respect to the longitudinal axis and the direction of travel of the padding machine. The discharge conveyor belt 104 is positioned beneath the upper end of the inclined screening belt 102, so as to receive soil carried upwardly on the screening belt. The discharge conveyor belt 104 extends outwardly through an opening in the side frame member, and extends up to several feet from the frame to as to enable fine-grained soil to be conveyed into a nearby trench. The discharge conveyor 104 is mounted to the frame beneath an upper run 103 of the screening belt 102 wherein the discharge conveyor 104 receives the padding material passing through the screen and discharges the padding material into the ditch.

Figure 8:
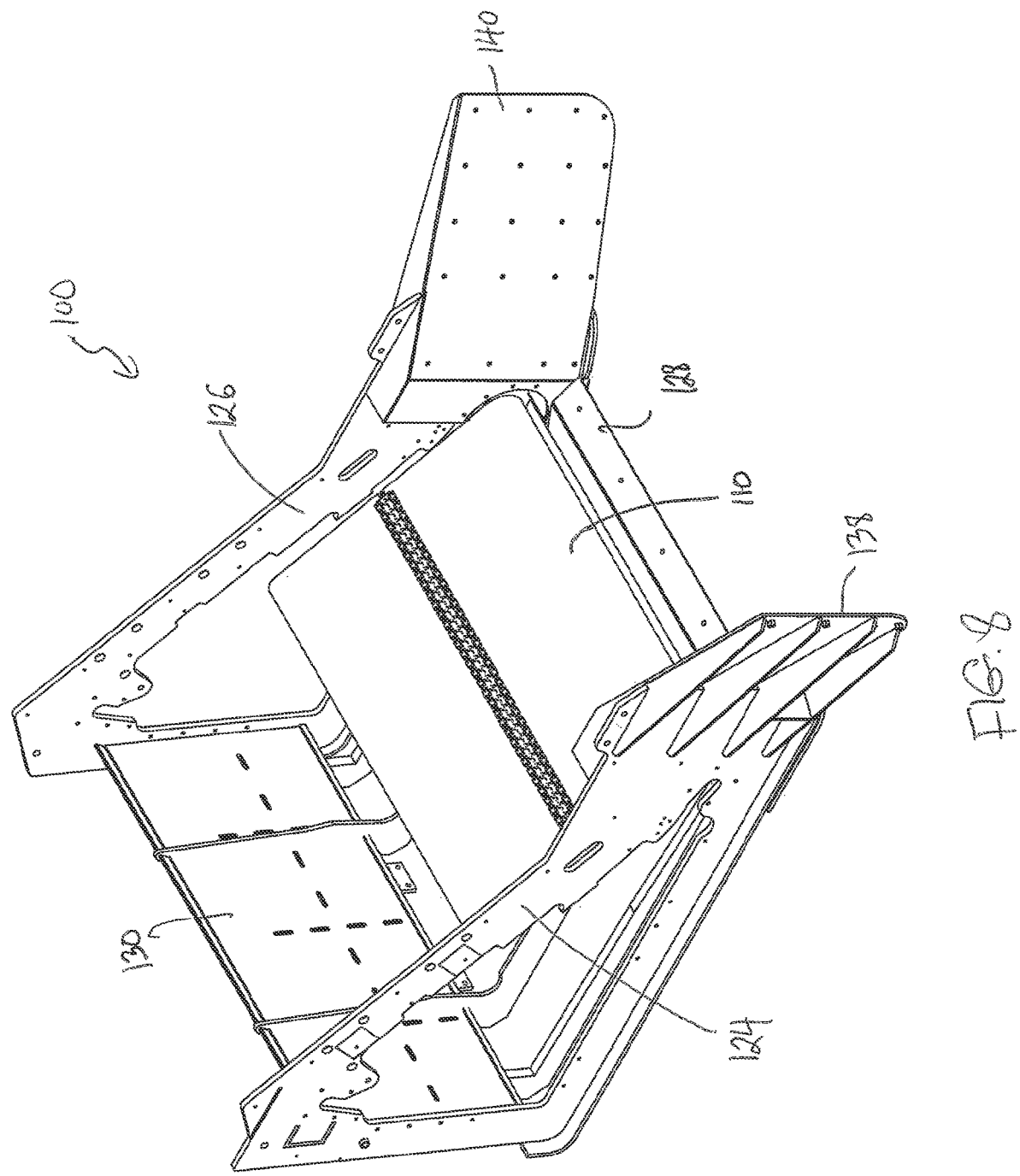
FIG. 8 is an isometric view of a padding machine having an elevator belt.

FIG. 8 is an isometric view of a padding machine 100 having an elevator belt 110. The padding machine has side frame members 124 and 126 and outwardly disposed wings 138 and 140 at their lower front ends, which function to collect and guide soil toward the center of the machine. The side frame members 124 and 126 are connected by several cross members, including a bottom frame member 128 and a solid rear cross plate 130. The frame can include optional reinforcing members, cross bars, or safety bars.

Figure 9:
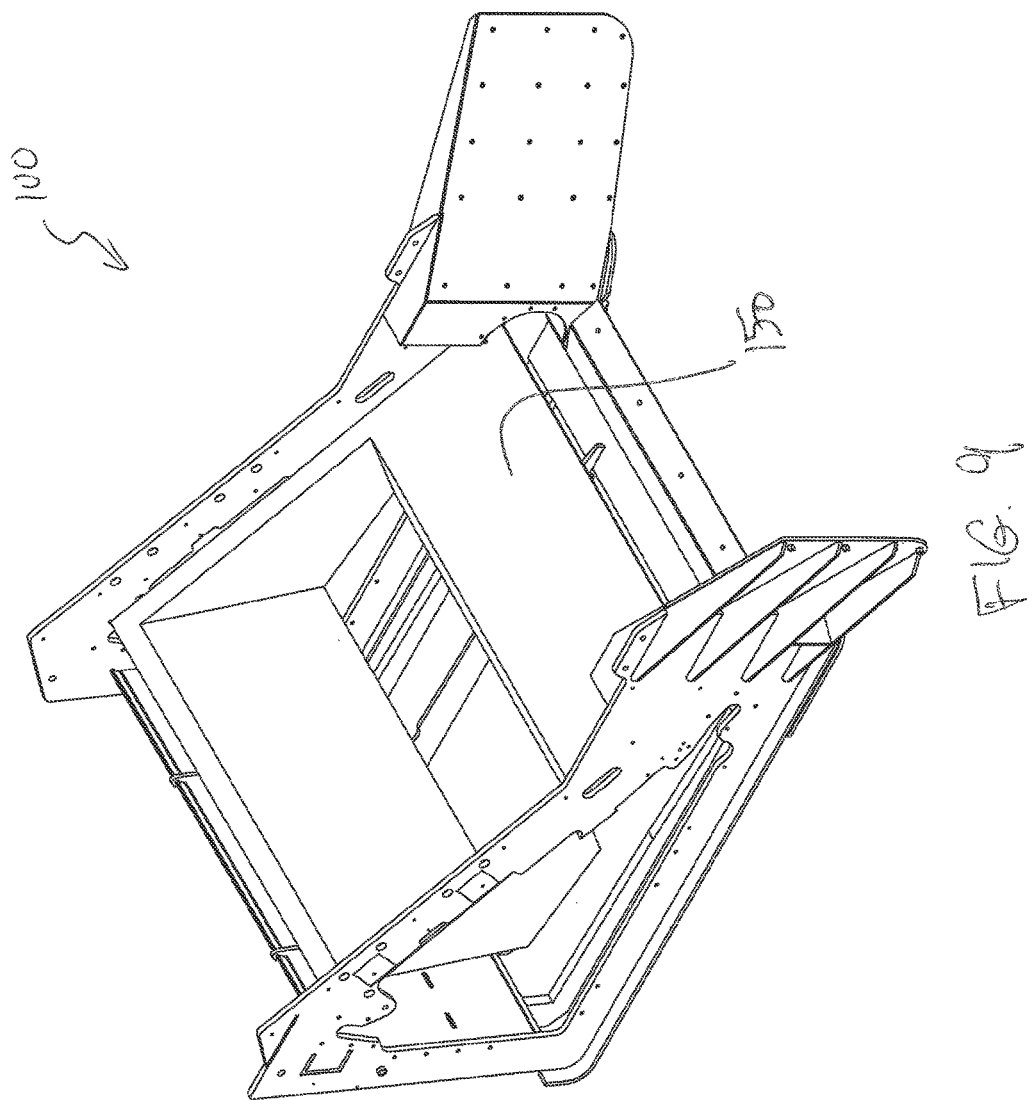
FIG. 9 is an isometric view of a padding machine having an elevator plate.

FIG. 9 is an isometric view of a padding machine 100 having an elevator plate 150. The plate may be a flat plate made of steel or polymer over which the screen is drawn so as to pull the material over the opening. This plate provides almost the same effectiveness of the belt but at a much lower cost and complexity. The padding machine can be modified or adapted for different soil conditions or jobs by switching between the plate and belt. The plate is good for general purpose use but if in extreme conditions it is best, to revert back to the belt for its slightly better performance. A padding machine capable of swapping between these systems represents a substantial improvement in the art.

Figure 10:
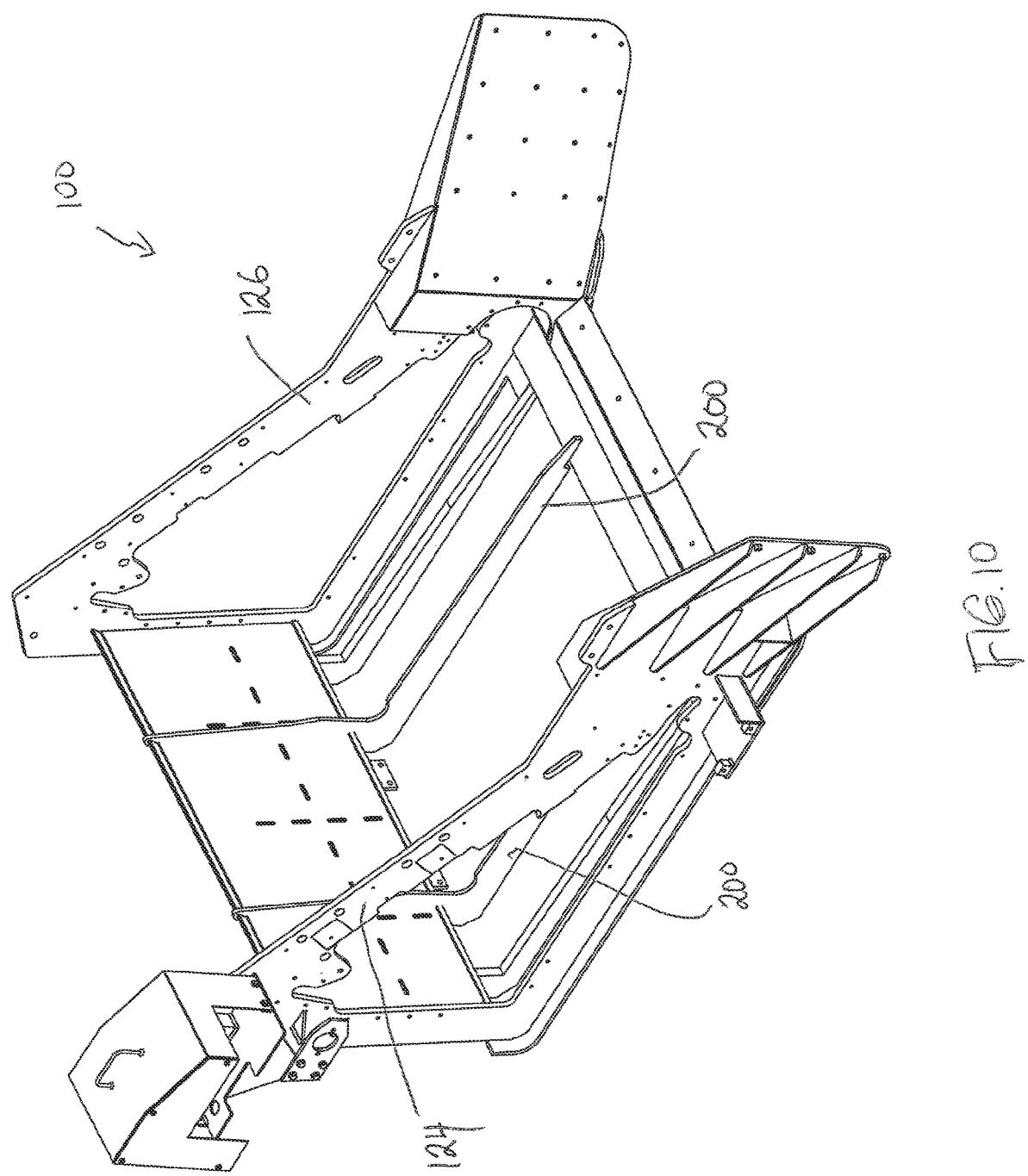
FIG. 10 is an isometric view of a padding machine having frame rails.

FIG. 10 is an isometric view of a padding machine 100 having frame rails 200. The frame rails 200 are parallel and spaced-apart from each other and are likewise parallel and spaced-apart from the side frame members 124 and 126. The number and spacing of the frame rails 200 may be varied from what is shown in the figures.

Figure 11:
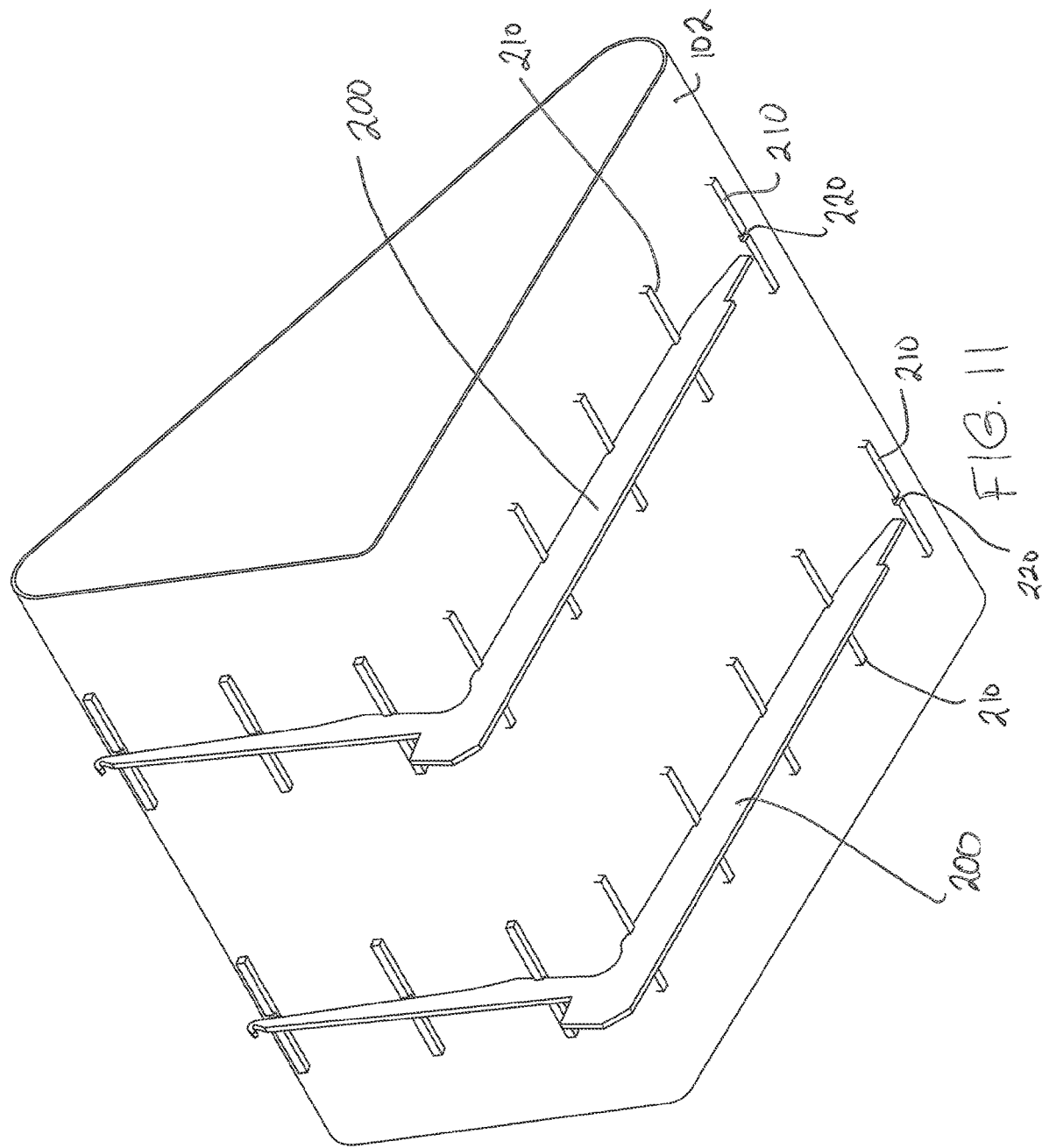
FIG. 11 is an isometric view of the engagement of the screen and rails.

FIG. 11 is an isometric view of the engagement of the screen 102 and rails 200. The screen 102 has bars or ribs (called flights) 210 attached to the screen. The bars (flights) have notches 220 sized and shaped to enable the ribs 210 of the screen 102 to slide over the rails 200. In the embodiment shown in FIG. 11, the bars (flights) are equally spaced over the screen. As shown in the illustrated embodiment of FIG. 11, the padding machine can have two spaced-apart parallel generally L-shaped frame rails 200.

Figure 12:
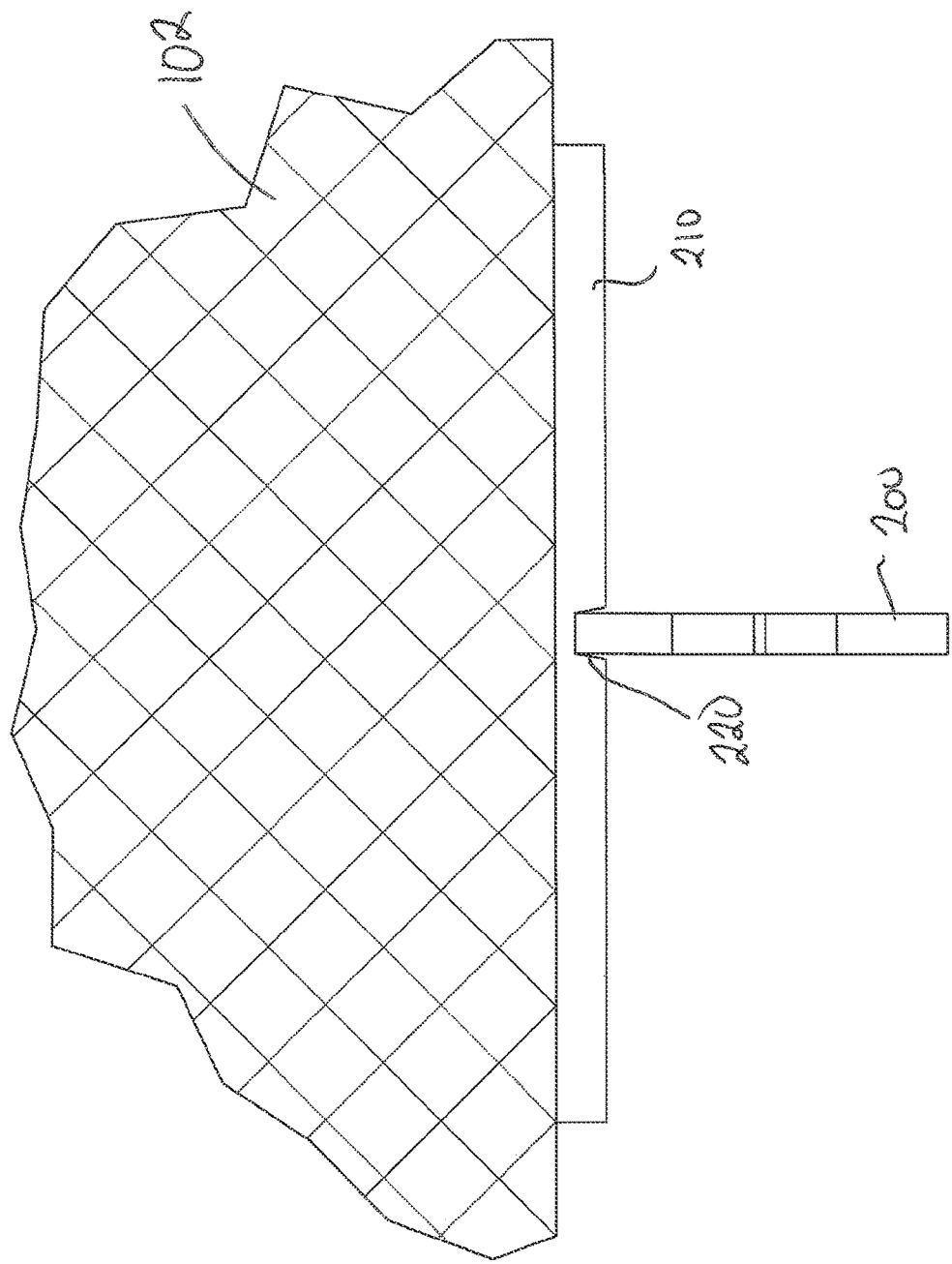
FIG. 12 is a front view of the engagement of the screen and rails.

FIG. 12 is a front view of the engagement of the screen 102 and a rail 200. FIG. 12 shows the bar/flight 210 and its notch 220 that is adapted (i.e. sized and shaped) to provide a sliding fit over the rail. The screen 102 of FIG. 12 may be a steel screen or a composite polymer-steel screen (e.g. a polyurethane-steel screen) as described above.

Figure 13:
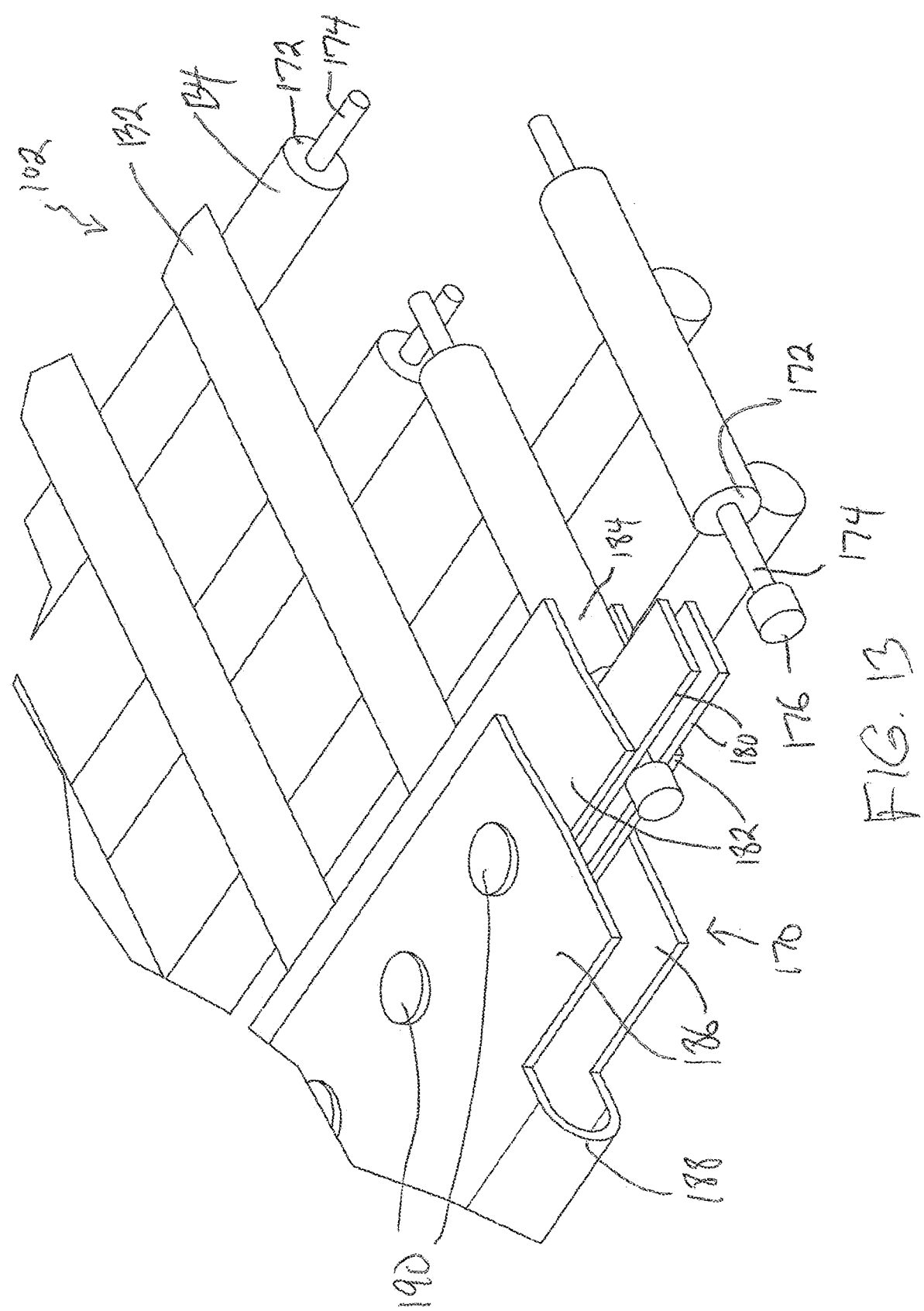
FIG. 13 is an isometric view of the composite polymer-steel screen.
Figure 14:
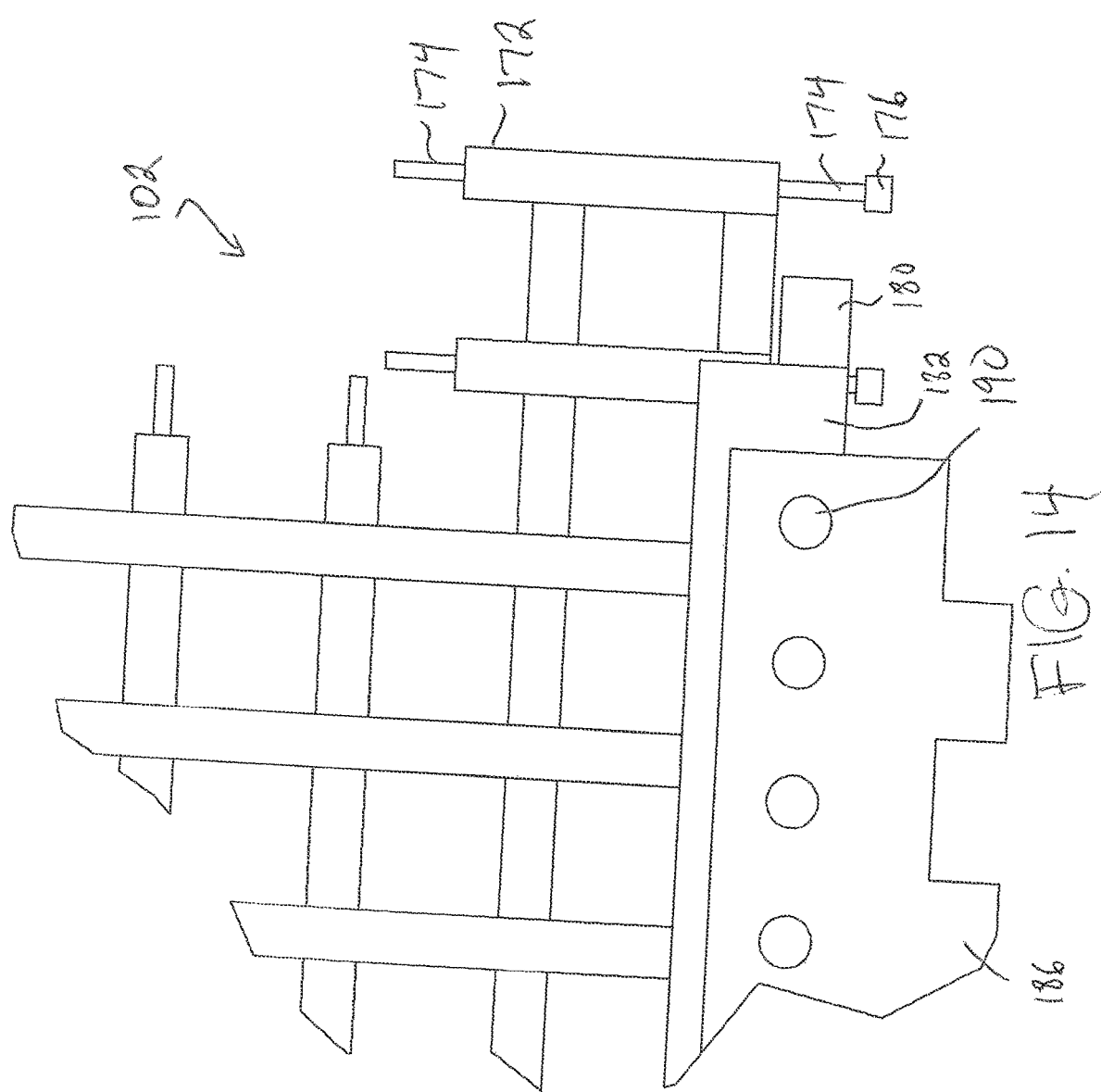
FIG. 14 is a plan view of the composite polymer-steel screen.

FIGS. 13 and 14 are isometric and plan views of the composite polymer-steel screen 102. FIGS. 13 and 14 depict the construction of the screen 102. As shown in FIGS. 13 and 14, the screen 102 in this particular implementation has orthogonal wire-like members 132, 134 that are overlaid or interlaced to form a mesh or lattice. In this embodiment, the orthogonal wire-like members are polyurethane-coated steel wires, i.e. a tubular coating of polyurethane surrounding a steel inner core to form a composite cable. An innovative hinge mechanism or hinge assembly 170 makes this screen robust. To manufacture the hinge mechanism 170, the tubular polyurethane (PU) coating 172 is stripped away or otherwise removed from the ends of the wire-like members 132, 134 to expose the steel inner core 174. A steel cable fitting or cylindrical head 176 is crimped onto the exposed steel inner core to act as a stopper. Two small strips 180 of mild steel (or equivalent) are laid down beside the cable to act as a gripping surface. Strips of polyurethane 182 are placed on the outer surfaces of the metal strips 180 as shown in FIG. 13. The strips of polyurethane 182 also extend over and under a portion 184 of the polyurethane tubular coating. The strips 182 thus grip both the exposed steel cores and the tubular PU coating so that, under stress, the steel wire cannot pull out of the rest of the PU coating. A cover piece 186 of mild steel (or equivalent) is folded or bent to form a U-shaped hinge 188. The cover piece 186 clasps or "sandwiches" together the various strips 180, 182. The hinge assembly is screwed, riveted, or welded through both the PU and mild steel strips. A plurality of fasteners, rivets, or welds 190 are used in the illustrated embodiment to secure the various strips of the hinge mechanism. This layered construction creates an extremely tight grip on both the inner steel core of the screen and the PU coating which provides a stable and robust hinge for long-term use.

Figure 15:
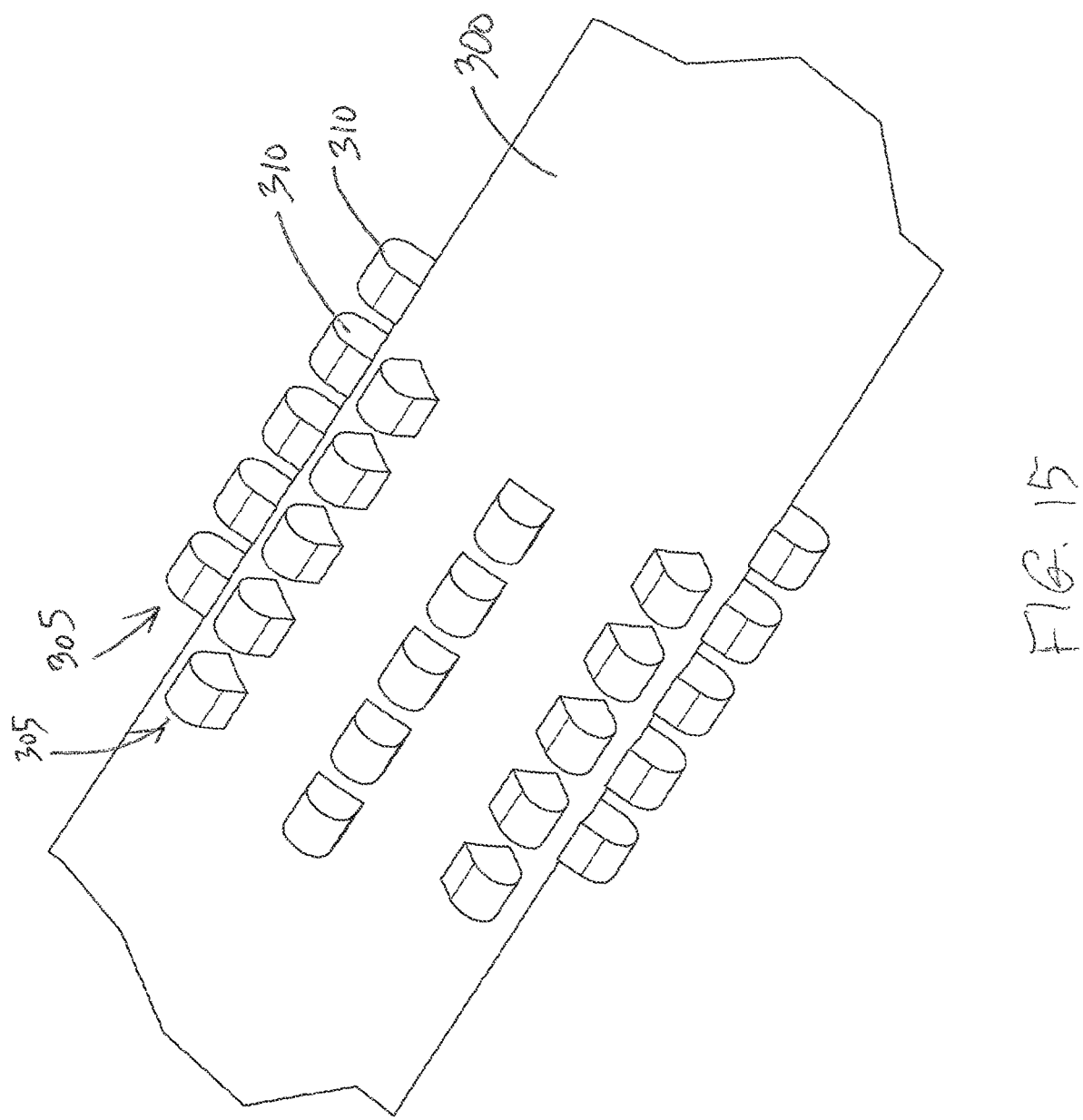
FIG. 15 depicts the lower pulley teeth.

FIG. 15 depicts the lower pulley teeth which are sized and shaped to engage the screen. As depicted in FIG. 15, the lower pulley 300 has rows 305 of teeth 310. In this specific implementation, each row 305 has five teeth 310. It will be appreciated that in other variants the number of teeth may be varied in order to accommodate different screen designs (different mesh size). In this illustrated embodiment, the teeth are all of the same shape and size although this may be varied in other embodiments. In this illustrated embodiment, the teeth in each row are equally spaced apart from each other. This may be varied in other embodiments.

Figure 16:
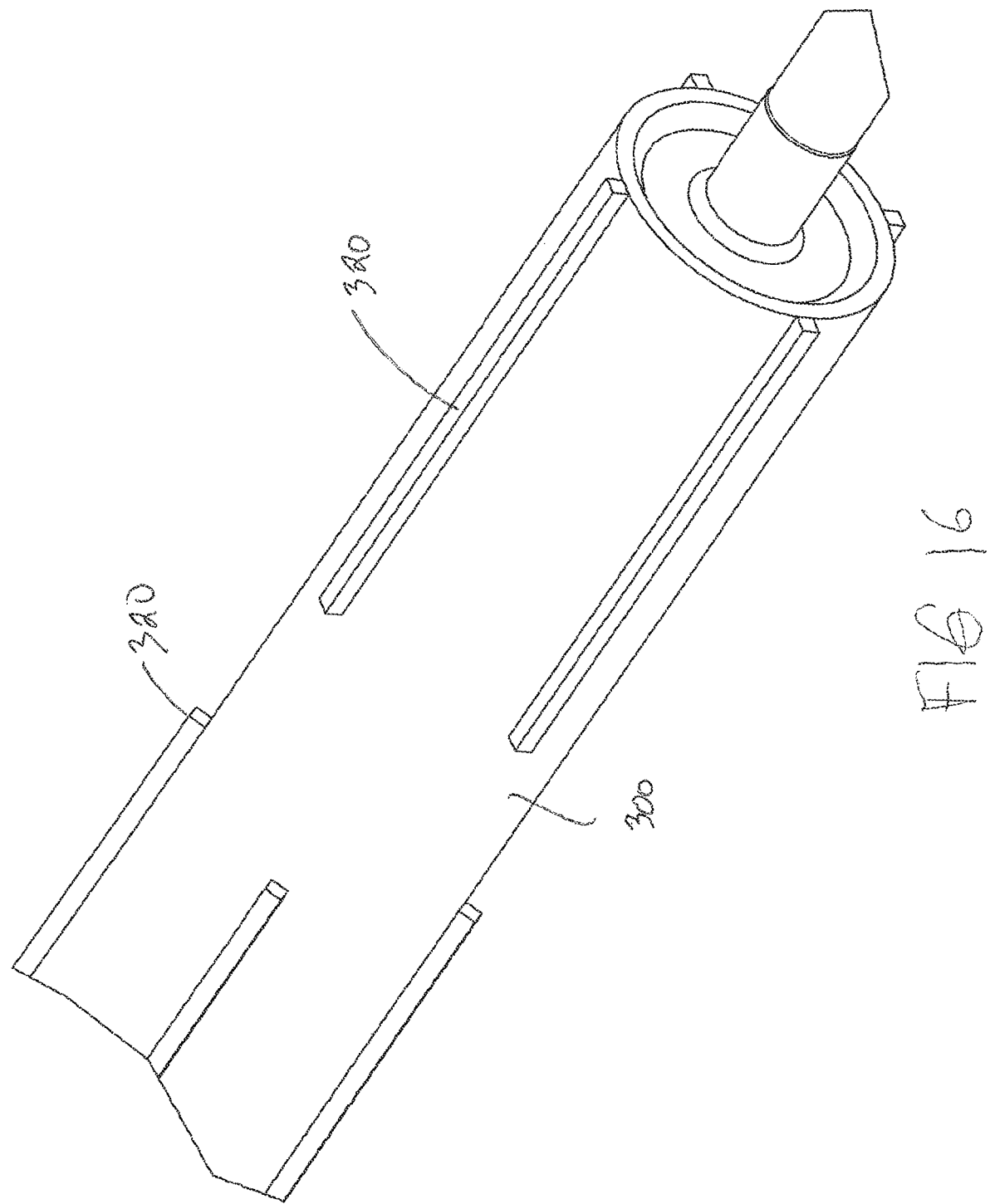
FIG. 16 depicts the lower pulley bars.

FIG. 16 depicts the lower pulley bars. As depicted, the lower pulley 300 has pulley bars 320. The pulley bars 320 engage the corresponding screen-mounted bars or ribs 210 on the underside of the screen 102, providing sufficient transmission of torque while also allowing for some slippage in situations where the material is hard to work with and where transmitting the full torque to a stalled screen may cause damage.

Figure 17:
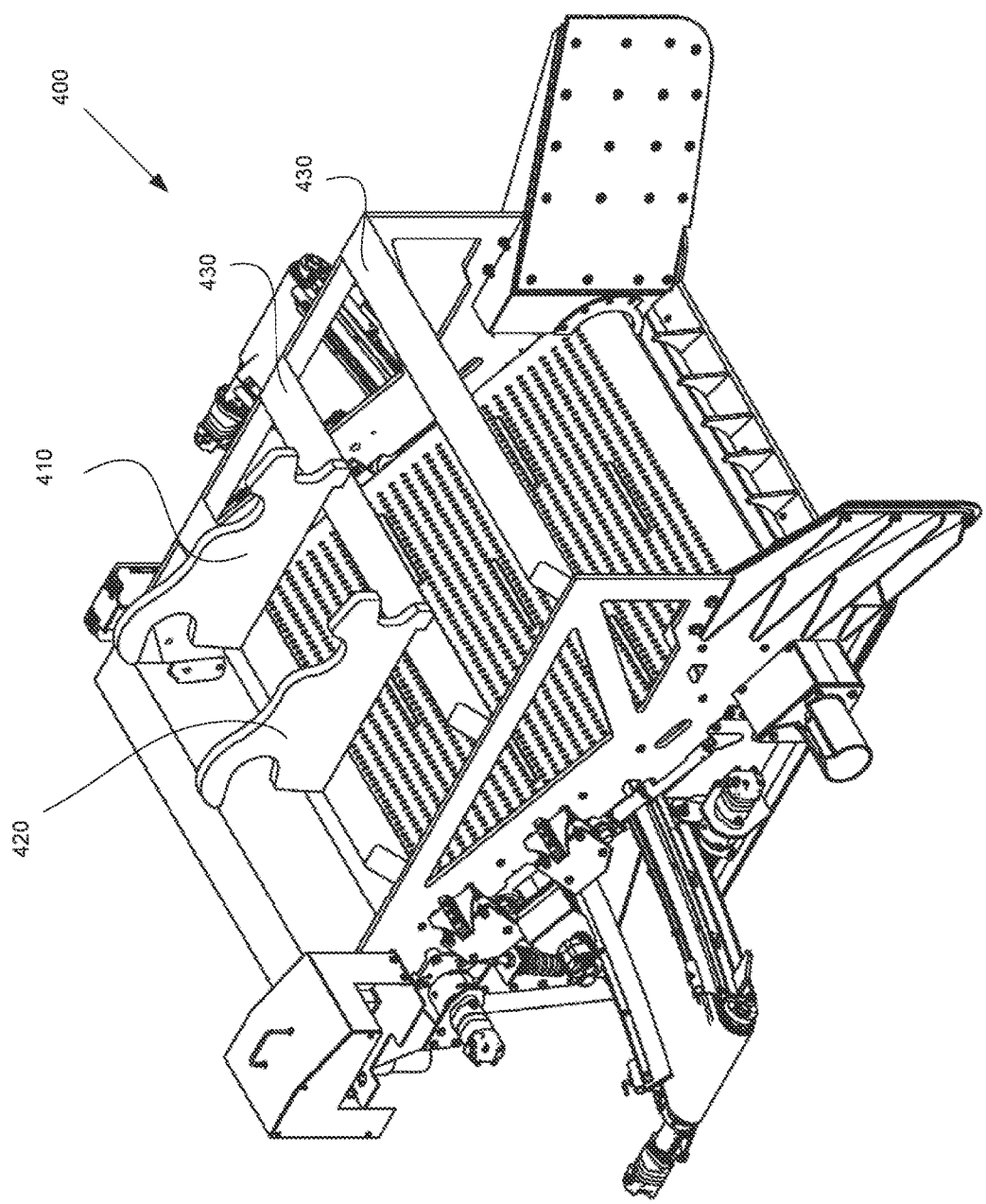
FIG. 17 is an isometric view of a padding machine having mounting hooks in accordance with another embodiment of the present invention.

FIG. 17 depicts a modified padding machine 400 having mounting hooks 410, 420 in accordance with another embodiment of the present invention. The mounting hooks are supported by traverse members 430 of the frame. The mounting hooks 410, 420 are parallel and spaced apart in this illustrated embodiment. The mounting hooks 410, 420 enable the padding machine to be hung from a stick of an excavator. The frame is designed to hang the padding machine from directly its center of gravity.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A padding machine for moving along a side of a ditch, scooping up excavated material from the side of the ditch, and sifting the excavated material into padding material for filling in the ditch, the padding machine comprising:
    a frame comprising side frame members and frame rails spaced apart from the side frame members; and
    a screening belt driven around pulleys supported by the frame, the screening belt comprising a screen for collecting and conveying the excavated material upwardly, wherein the screen comprises apertures for sifting the excavated material into padding material by permitting the padding material to fall through the apertures of the screen, wherein the screen runs over the frame rails which support the screen, the screen having ribs attached to the screen, each rib having a notch sized and shaped to enable the rib to slide over a respective frame rail; and
    a discharge conveyor mounted to the frame beneath an upper run of the screening belt wherein the discharge conveyor receives the padding material passing through the screen and discharges the padding material into the ditch.

2. The padding machine of claim 1, wherein the frame rails comprise two spaced-apart parallel generally L-shaped frame rails.

3. The padding machine of claim 2, further comprising a front attachment mechanism for detachably mounting to a tracked vehicle.

4. The padding machine of claim 1, wherein the screen is made of steel.

5. The padding machine of claim 1, wherein the screen is made of polyurethane-coated steel.

6. The padding machine of claim 5, wherein the screen includes a hinge assembly that comprises polyurethane and steel strips secured between a U-shaped cover piece.

7. The padding machine of claim 6 wherein a tubular polyurethane coating is stripped away from ends of wire members of the screen to expose a steel inner core.

8. The padding machine of claim 7, wherein a steel cable fitting is crimped onto the exposed steel inner core to act as a stopper.

9. The padding machine of claim 8, wherein two strips of mild steel are laid down beside the steel cable fitting to act as a gripping surface and wherein strips of polyurethane are placed on the outer surfaces of the strips of mild steel.

10. The padding machine of claim 9, wherein the strips of polyurethane also extend over and under a portion of the polyurethane tubular coating such that the strips of polyurethane grip both the exposed steel inner core and the tubular polyurethane coating.

11. The padding machine of claim 10, wherein the cover piece is secured to the steel and polyurethane strips by screws, rivets, or welds.

12. The padding machine of claim 11 further comprising a front attachment mechanism for detachably mounting to a tracked vehicle.

13. The padding machine of claim 1, wherein one of the pulleys comprises teeth sized and shaped to grip the screen.

14. The padding machine of claim 1, wherein one of the pulleys comprises bars sized and shaped to engage the ribs of the screen.

15. The padding machine of claim 1 comprising an elevator plate.

16. The padding machine of claim 15, wherein the elevator plate is interchangeable with an elevator belt.

17. The padding machine of claim 1 further comprising a front attachment mechanism for detachably mounting to a tracked vehicle.

* * * * *